United States Patent [19]

Hasegawa

[11] Patent Number: 4,959,270
[45] Date of Patent: Sep. 25, 1990

[54] LAMINATED STRUCTURE FORMED OF CERAMIC COLOR LAYER AND CONDUCTIVE LAYER

[75] Inventor: Jun Hasegawa, Osaka, Japan

[73] Assignee: Nippon Sheet Glass Co., Ltd., Osaka, Japan

[21] Appl. No.: 222,107

[22] Filed: Jul. 20, 1988

[30] Foreign Application Priority Data

Jul. 20, 1987 [JP] Japan .................. 62-110815

[51] Int. Cl.$^5$ ............ B32B 7/00; B32B 17/06
[52] U.S. Cl. .................... 428/426; 219/203; 428/38; 428/195; 428/209; 428/210; 428/432; 428/689; 428/701; 428/212
[58] Field of Search ............ 428/432, 426, 701, 689, 428/38, 209, 210, 195; 219/203

[56] References Cited

U.S. PATENT DOCUMENTS

| | | | |
|---|---|---|---|
| 3,903,344 | 9/1975 | Laiming | 428/213 |
| 4,623,582 | 11/1986 | Hasegawa et al. | 428/220 |
| 4,728,781 | 3/1988 | Donley et al. | 428/426 |
| 4,755,659 | 7/1988 | Leon et al. | 219/547 |

Primary Examiner—Ellis P. Robinson
Assistant Examiner—Archene A. Turner
Attorney, Agent, or Firm—Lowe, Price, LeBlanc, Becker & Shur

[57] ABSTRACT

A laminated structure [10; 20; 30] formed of a ceramic color layer and a conductive layer comprises a ceramic color layer [2; 22; 32] formed on the surface of plate glass [11] and a conductive layer [3] formed on the surface of said ceramic color layer and containing silver ions. At least a partial layer [2; 22b; 32b] constituting said ceramic color layer and located on the side on which said conductive layer is formed is comprised of any one of a ceramic layer [2; 22b] containing a reducing agent and a ceramic layer [32b] having a higher melting point.

14 Claims, 1 Drawing Sheet

LAMINATED STRUCTURE FORMED OF CERAMIC COLOR LAYER AND CONDUCTIVE LAYER

BACKGROUND OF THE INVENTION

1. Field of the invention

The present invention relates to a laminated structure formed of a ceramic color layer and a conductive layer, formed on a windshield (made of plate glass) for cars.

2. Description of the prior art

On some rear windshields of automobiles, bus bars for defogging and slender hot wires extending between the bus bars are formed. These bus bars and hot wires are conductive layers formed on the glass surface by printing a silver paste on the interior surface of the windshield of cars followed by melting to give adhesion. The bus bars, which are broad, are very conspicuous when viewed from the exterior side of cars. Now, for the purpose of concealing the bus bars from the exterior side of cars, it has been practiced to form as shown in FIG. 5 a ceramic color layer 101 on the peripheral edge of a windshield 100 and between the windshield 100 and a bus bar 102.

To form the bus bar 102 on the ceramic color layer 101 as stated above, the ceramic color layer 101 is first printed on the windshield 100 and thereafter the color layer 101 is dried or cured. Next, a silver paste is printed on the ceramic color layer 101 and thereafter the silver paste is dried or cured. Then the ceramic color layer 101 and the silver paste are simultaneously melted to give adhesion, i.e., fired, at a high temperature caused when the windshield 100 is formed to have a bend. In general, the above ceramic color layer 101 is so prepared that it may contain after firing, 55 to 90 wt. % of frit and 10 to 45wt. % of a pigment.

However, at the time when the above ceramic color layer 101 and silver paste are simultaneously fired on the windshield, silver ions in the silver paste tend to diffuse and migrate through the frit in the ceramic color layer 101 and reach the interior surface of the windshield of cars to cause ionic color formation 103. This ionic color formation can be visually recognized from the exterior side of cars, resulting in a deterioration in the appearance of the windshield 100.

Taking account of the above problems involved in the laminated structure formed of the ceramic color layer and the conductive layer, the present invention was so made that these problems can be effectively solved.

SUMMARY OF THE INVENTION

An object of the present invention is to provide a laminated structure formed of a ceramic color layer and a conductive layer, that can prevent the silver-ionic color formation on the part at which the ceramic color layer faces plate glass, even when the ceramic color layer and the conductive layer containing silver ions are simultaneously melted to give adhesion to the plate glass.

To achieve the above object, the present invention provides a laminated structure formed of a ceramic color layer and a conductive layer, comprising a ceramic color layer formed on the surface of plate glass, and a conductive layer formed on the surface of said ceramic color layer and containing silver ions, wherein at least a partial layer constituting said ceramic color layer and located on the side on which said conductive layer is formed is comprised of any one of a ceramic layer containing a reducing agent and a ceramic layer having a higher melting point.

Preferred embodiments of the present invention will be described below with reference to the accompanying drawings, from which further features, objects and advantages of the present invention will become apparent of its own accord.

DESCRIPTION OF PREFERRED EMBODIMENTS

Figure 1:
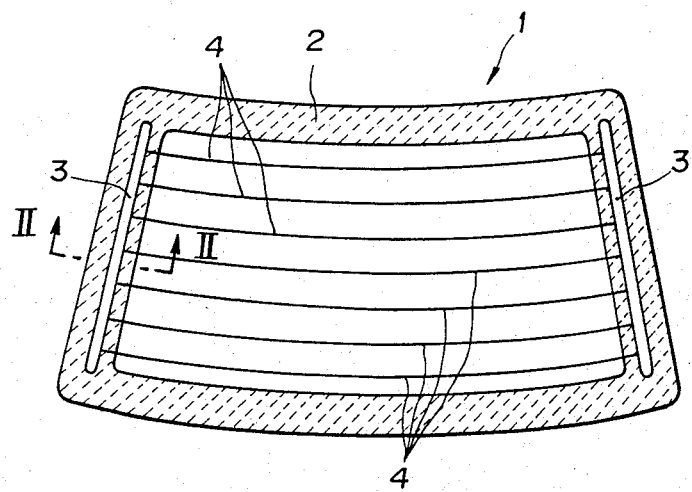
FIG. 1 is a front view illustrating the whole of a rear windshield for cars, that has employed a laminated structure formed of a ceramic color layer and a conductive layer according to a first embodiment of the present invention.
Figure 2:
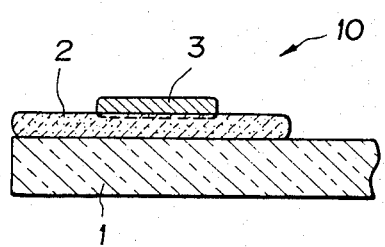
FIG. 2 is a cross section along the line II—II in FIG. 1.

With reference to FIG. 1 and FIG. 2, the numeral 1 in the drawing denotes a rear windshield (plate glass) for cars that has employed a laminated structure 10 formed of a ceramic color layer and a conductive layer according to a first embodiment of the present invention. Assume that the paper surface side in the drawing corresponds to the interior side of cars. Formed on the surface of the plate glass, preferably along peripheral edge of the interior surface of the windshield, 1 is a ceramic color layer 2. On the surface of the ceramic color layer 2, facing the interior of cars, formed at both sides of the color layer 2 are bus bars 3. Formed between the bus bars 3, 3 are a plural number of slender hot wires 4.

The above ceramic color layer 2 is so prepared that it may contain, after firing, three components consisting of frit, a pigment and a reducing agent.

The frit comprises a low-melting temperature lead glass.

The pigment comprises $Cr_2O_2$, $Fe_2O_3$, $CuO$, etc.

Used as the reducing agent is powder of metals such as Cu, Fe, Al, Pb, Sn and Zn among which Cu, Fe and Al are ready to handle. Alternatively, a product obtained by mixing a metal salt into a vehicle (=oil+resin) and formed into a paste may also be used as the reducing agent.

The ceramic color layer 2 is printed on the windshield 1 and thereafter dried or cured. After that, the color layer 2 is melted to give adhesion, i.e., fired, to the windshield 1 a temperature in the range of 500° to 750° C.

The ceramic color layer 2 is so prepared that the above reducing agent may be contained in a weight percentage of from 2.0 to 20 wt. %, preferably from 5.0 to 10 wt. %, under the state that the color layer 2 has been fired on the windshield 1.

Figure 3:
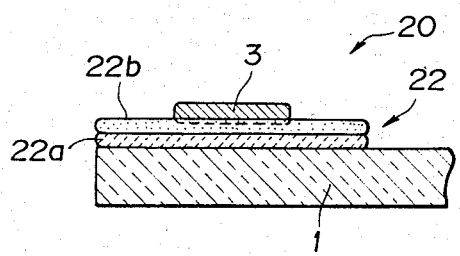
FIG. 3 is a cross section illustrating a laminated structure formed of a ceramic color layer and a conductive layer according to a second embodiment of the present invention.

In FIG. 3, illustrated is a cross section of a laminated structure 20 formed of a ceramic color layer and a conductive layer according to a second embodiment of the present invention. The same numerals are applied to the same members as those in the embodiment illustrated in FIG. 1 and FIG. 2. In this embodiment too, the laminated structure is applied to the rear windshield 1.

A ceramic color layer 22 is formed on the peripheral edge of the interior surface of the windshield 1 of cars. The color layer 22 is comprised of a windshield-side layer 22a and a bus-bar-side layer 22b. A bus bar 3 serving as a conductive layer is formed on the bus-bar-side layer 22b.

The windshield-side layer 22a comprises a conventional ceramic layer containing two components consisting of frit and a pigment. The ceramic layer 22b on the bus bar 3 side contains two components consisting of frit, and metal powder serving as a reducing agent.

The ceramic layer 22b is so prepared that the frit and metal powder may be contained in the ceramic layer 22b on the bus bar 3 side in a weight percentage of the following proportion, under the state that the ceramic layer 22b has been fired.

Frit: from 80 to 99 wt. %
Reducing agent (metal powder): from 1.0 to 20 wt. %, preferably from 3.0 to 8.0 wt. %.

Figure 4:
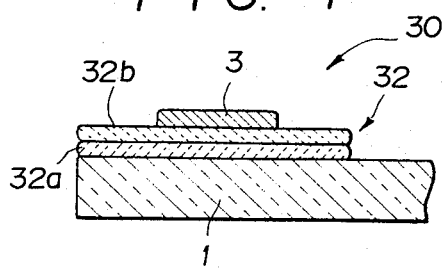
FIG. 4 is a cross section illustrating a laminated structure formed of a ceramic color layer and a conductive layer according to a third embodiment of the present invention.

FIG. 4 illustrates a cross section of a laminated structure 30 formed of a ceramic color layer and a conductive layer according to a third embodiment of the present invention. The same numerals are applied to the same members as those in the embodiment illustrated in FIG. 1 and FIG. 2. This laminated structure 30 is also applied to the rear windshield 1. A ceramic color layer 32 is formed on the peripheral edge of the interior surface of the windshield 1 of cars. The color layer 32 is comprised of a windshield-side layer 32a and a bus-bar-side layer 32b. A bus bar 3 serving as a conductive layer is formed on the bus-bar-side layer 32b.

The above windshield-side color layer 32a comprises a lower-temperature fusible color suited for carrying out the firing at about 600° C., and is so prepared that it may contain two components consisting of frit and a pigment under the state that the firing has been carried out. The color layer 32b on the bus bar 3 side is a higher-temperature fusible color suited for carrying out the firing at about 650° C., and is so prepared that it may contain two components consisting of frit and a pigment under the state that the firing has been carried out. Since both the color layers 32a and 32b are simultaneously fired on the plate glass 1, the firing temperature (about 600° C.) for the windshield-side color layer 32a brings about the bus-bar-side color layer 32b containing highly viscous frit.

Difference in the melting temperature for the ceramic color layers 32a and 32b in the above laminated structure 30 may preferably be in the range of from 30 to 70° C. The temperature difference otherwise smaller than 30° C. may result in no remarkable effect of preventing the silver-ionic color formation. Also, the temperature difference otherwise larger than 70° C. may bring the ceramic of the lower-melting side (32a) into a molten state with a low viscosity at the time when the ceramic of the higher-melting side (32b) has been melted, resulting in difficulties such as blistering generated in said ceramic (32a).

In all of the above three laminated structures 10, 20 and 30, the bus bar 3 is formed in the following manner: In the first place, ceramic color powder having the components as described above is mixed into a vehicle to form a paste, which is printed on the glass followed by drying or curing. This drying treatment brings the vehicle in the ceramic colored paste to evaporate to be removed. Next, silver paste is coated on the ceramic color layer 2, 22 or 32 and then dried. The treatment of drying the silver paste brings the vehicle in the silver paste to evaporate to be removed. The silver paste components each have a weight percentage as follows:

Powdery silver: 70 to 80 wt. %
Frit: 3 to 5 wt. %
Vehicle: 15 to 27 wt. %

Thereafter, the dried silver paste and the dried ceramic color layer are simultaneously treated by firing. In this occasion, an electrode for an antenna of a car television may be formed in place of the bus bar, by printing, drying and firing the silver paste.

In the laminated structure 10 illustrated in FIG. 2 and the laminated structure 20 illustrated in FIG. 3, the ceramic color layer 2 or 22 contains metal powder having a reducing action. Silver contained in the silver paste is prevented from being ionized at the time of firing the color layer 2 or 22 and the bus bar 3. Accordingly, silver ions are prevented from being diffused into the frit in the ceramic color layer 2 or 22, so that the ionic color formation can be prevented. Thus, there can be obtained a rear windshield 1 having superior appearance.

In the laminated structure 30 illustrated in FIG. 4, the melting temperature for the windshield-side color layer 32a is lower than the melting temperature for the color layer 32b on the bus bar 3 side. At the time when the treatment temperature for firing both the color layers 32a and 32b reaches the melting temperature for the color layer 32a of the lower-melting side, the color layer 32a of the lower-melting side is sufficiently melted to give adhesion to the glass and undergo color formation, but the color layer 32b of the higher-melting side is not sufficiently melted to give a highly viscous state. Under such a state, the frit contained in each of the lower-melting side color layer 32a and the bus bar 3 flows into pores present inside the higher-melting side colored layer 32b. Accordingly, silver ions are prevented from being diffused from the silver paste to the windshield-side color layer 32a through the color layer 32b on the bus bar 3 side. As a result, the silver-ionic color formation can be prevented to obtain a rear windshield having a superior appearance.

TEST EXAMPLE

In the following Table, compared is whether the above laminated structures 10, 20 and 30 and the prior art laminated structure illustrated in FIG. 5 have caused the silver-ionic color formation or not.

Indications on the components in each ceramic color layer described below are made on those components present after firing.

Used as the windshield 1 was plate glass of 3 mm thick, and firing was carried out for only 10 minutes.

In the first laminated structure 10, 8.0 wt. % of powdery Al (aluminum) is mixed as a reducing agent in the ceramic color layer 2. The remainder comprises frit and pigments.

In the second laminated structure 20, 50 wt. % of powdery Al is also contained as a reducing agent in the ceramic layer 22b on the bus bar 3 side. The remainder comprises frit.

In the third laminated structure 30, ceramic suited for carrying out firing at 600° C. is used as a windshield-side color layer 32a. Also, ceramic formed from glass frit containing a dispersant and suited for carrying out firing at 650° C. is used as the color layer 32b on the bus bar 3 side. The frit in the latter color layer 32b comprises borate glass or borosilicate lead glass, and the dispersant comprises methyl cellulose or ethyl cellulose.

TABLE

Figure 5:
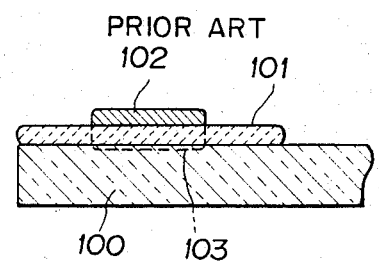
FIG. 5 is a cross section illustrating a laminated structure formed of a ceramic color layer and a conductive layer according to the prior art.

| Firing temp.: | 580° C. | 600° C. | 620° C. | 640° C. | 660° C. |
|---|---|---|---|---|---|
| Laminated structure 10 | Y | A | A | X | X |
| Laminated structure 20 | Y | A | A | A | A |
| Laminated structure 30 | Y | A | A | A | A |
| Prior art of FIG. 5 | Y | X | X | X | X |

In the above Table, what is indicated by each sign is as follows:
A: No color formation due to silver ions occurred.
X: Color formation due to silver ions occurred.
Y: Ceramic color layer has not been completely fired.

As will be understood from the above Table, the present invention can effectively present the silver-ionic color formation on the part at which the ceramic color layer faces the plate glass, even when the ceramic color layer and the ion-containing conductive layer are simultaneously fired on the surface of the plate glass.

The reducing agent comprising metal powder or the like may also be added in the higher-melting color layer 32b illustrated in FIG. 4.

What is claimed is:

1. A laminated structure formed of a ceramic color layer and a conductive layer, comprising:
    a ceramic color layer formed on a surface of a glass plate; and
    a conductive layer formed on a surface of said ceramic color layer and containing silver ions;
    wherein a partial layer constituting at least said ceramic color layer, located on a same side of said plate as said conductive layer is located, comprises a ceramic layer containing a reducing agent.

2. The laminated structure according to claim 1, wherein said partial layer constituting said ceramic color layer and located on the side on which said conductive layer is formed comprising only said ceramic color layer itself, and said ceramic color layer contains a reducing agent.

3. The laminated structure according to claim 2, wherein said reducing agent contained in said ceramic color layer is powder of a metal selected from the group consisting of Cu, Fe, Al, Pb, Sn and Zn.

4. The laminated structure according to claim 3, wherein said ceramic color layer contains 2.0 to 20 wt. % of said metal serving as said reducing agent.

5. The laminated structure according to claim 4, wherein said ceramic color layer contains 5.0 to 10 wt. % of said metal serving as said reducing agent.

6. The laminated structure according to claim 1, wherein said reducing agent contained in said partial layer of said ceramic color layer is powder of a metal selected from the group consisting of Cu, Fe, Al, Pb, Sn and Zn.

7. The laminated structure according to claim 6, wherein said partial ceramic layer of said ceramic color layer contains 1.0 to 20 wt. % of said metal serving as said reducing agent.

8. The laminated structure according to claim 7, wherein said partial ceramic layer of said ceramic color layer contains 3.0 to 8.0 wt. % of said metal serving as said reducing agent.

9. The laminated structure according to claim 12, wherein;
    the melting temperature for said first color layer of said ceramic color layer is 30° to 70° C. higher than the melting temperature for said second color layer; and
    said first and second color layers are simultaneously fired on said plate glass at the melting temperature for said second color layer.

10. A laminated structure formed of a ceramic color layer and a conductive layer, comprising:
    a ceramic color layer formed on a surface of a glass plate; and
    a conductive layer formed on a surface of said ceramic color layer and containing silver ions;
    wherein at least a partial layer constituting said ceramic color layer, located on a same side of said plate on which said conductive layer is located, comprises a first ceramic color layer having a relatively high melting point and a second ceramic color layer having a relatively low melting point,
    said relatively low melting point of said second ceramic color layer being lower than said relatively high melting point of said first ceramic color layer.

11. The laminated structure according to claim 10, wherein said melting point of said first color layer is higher than the melting point of said second color layer by a temperature in the range of 30 to 70 degrees centigrade.

12. The laminated structure according to claim 1, wherein said ceramic color layer is formed on a peripheral portion of the surface of the plate glass.

13. The laminated structure according to claim 10, wherein said second ceramic color layer is located on a side of said ceramic color layer facing said glass plate and said first ceramic color layer is located on a side of said ceramic color layer facing said conductive layer.

14. The laminated structure according to claim 1, wherein said partial layer includes first and second layers, respectively located adjacent said glass plate and adjacent said conductive layer, wherein said second layer includes said reducing agent therein.

* * * * *